United States Patent
Huang et al.

(10) Patent No.: US 12,284,071 B2
(45) Date of Patent: *Apr. 22, 2025

(54) TECHNIQUES FOR PREDICTION MODELS USING TIME SERIES DATA

(71) Applicant: EQUIFAX INC., Atlanta, GA (US)

(72) Inventors: Xiao Huang, Marietta, GA (US); Yan Wang, Athens, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,258

(22) Filed: Jan. 17, 2024

(65) Prior Publication Data

US 2024/0195677 A1  Jun. 13, 2024

Related U.S. Application Data

(63) Continuation of application No. 17/218,161, filed on Mar. 31, 2021, now Pat. No. 11,894,971.

(51) Int. Cl.
*H04L 41/0631* (2022.01)
*H04L 41/16* (2022.01)
(Continued)

(52) U.S. Cl.
CPC ............ *H04L 41/064* (2013.01); *H04L 41/16* (2013.01); *H04L 43/04* (2013.01); *H04L 43/067* (2013.01)

(58) Field of Classification Search
CPC ....... H04L 41/064; H04L 41/16; H04L 43/04; H04L 43/067; H04L 63/10; H04L 47/83;
(Continued)

(56) References Cited

U.S. PATENT DOCUMENTS 11,367,142 B1 * 6/2022 Wang .................. G06F 16/2456
11,443,015 B2    9/2022 Modarresi
(Continued)

FOREIGN PATENT DOCUMENTS

CN         111105266 A     5/2020

OTHER PUBLICATIONS

U.S. Appl. No. 17/218,161, Advisory Action, Mailed on Jul. 24, 2023, 3 pages.
(Continued)

*Primary Examiner* — Nicholas R Taylor
*Assistant Examiner* — Angela Widhalm de Rodriguez
(74) *Attorney, Agent, or Firm* — Kilpatrick Townsend & Stockton LLP

(57) ABSTRACT

Various aspects involve a lagged prediction model trained for risk assessment or other purposes. For instance, a risk assessment computing system receives a risk assessment query for a target entity and provides an input predictor record for the target entity to a lagged prediction model. The input predictor record includes a first group of lagged values from a first time-series attribute associated with the target entity. The lagged prediction model is trained by implementing a group feature selection technique configured to select the first time-series attribute as input and to deselect a second time-series attribute associated with the target entity. The risk assessment computing system computes an output risk indicator from the input predictor record and transmits the output risk indicator to a remote computing system. The output risk indicator can be used to control access by the target entity to one or more interactive computing environments.

20 Claims, 6 Drawing Sheets

(51) Int. Cl.
*H04L 43/04* (2022.01)
*H04L 43/067* (2022.01)

(58) Field of Classification Search
CPC ... H04L 41/147; G06Q 10/0637; G06F 30/27; G06F 16/334
See application file for complete search history.

(56) References Cited

U.S. PATENT DOCUMENTS

| | | | |
|---|---|---|---|
| 2007/0233435 | A1 | 10/2007 | Bradski |
| 2018/0060744 | A1* | 3/2018 | Achin ............... G06N 20/00 |
| 2018/0285685 | A1 | 10/2018 | Singh et al. |
| 2018/0375886 | A1 | 12/2018 | Kirti et al. |
| 2020/0082040 | A1* | 3/2020 | Rajendran ............ G06F 30/27 |
| 2020/0097810 | A1 | 3/2020 | Hetherington et al. |
| 2021/0097425 | A1 | 4/2021 | Yang et al. |
| 2022/0076164 | A1 | 3/2022 | Conort et al. |
| 2022/0207324 | A1* | 6/2022 | Hamilton ............. G06N 3/049 |

OTHER PUBLICATIONS

U.S. Appl. No. 17/218,161, Final Office Action, Mailed on May 10, 2023, 19 pages.
U.S. Appl. No. 17/218,161, Non-Final Office Action, Mailed on Oct. 6, 2022, 17 pages.
U.S. Appl. No. 17/218,161, Notice of Allowance, Mailed on Sep. 27, 2023, 15 pages.
U.S. Appl. No. 63/076,308, Automated Feature Engineering for Machine Learning, filed Sep. 9, 2020, 62 pages.
Bartolucci, "Analysis of Binary Panel Data by Static and Dynamic Logit Models", University of Perugia, 2009, 45 pages.
Bolton, "Logistic Regression and its Application in Credit Scoring", University of Pretoria, 2009, 240 pages.
Burez et al., "Handling Class Imbalance in Customer Churn Prediction", Expert Systems with Applications, vol. 36, No. 3, Apr. 2009, pp. 4626-4636.
Butaru et al., "Risk and Risk Management in the Credit Card Industry", Journal of Banking & Finance, vol. 72, 2016, pp. 218-239.
Chen et al., "The Study of Credit Scoring Model Based on Group Lasso", Procedia Computer Sciencem, vol. 122, 2017, pp. 677-684.
Gonen, "Receiver Operating Characteristic (ROC) Curves", SAS Users Group International (SUGI), vol. 31, 2006, pp. 210-231.
Khandani et al., "Consumer Credit-Risk Models via Machine-Learning Algorithms", Journal of Banking & Finance, vol. 34, No. 11, Available Online at: https://www.sciencedirect.com/science/article/pii/S0378426610002372, Nov. 2010, pp. 2767-2787.
Meier et al., "The Group Lasso for Logistic Regression", Journal of Royal Statistical Society Series B, vol. 70, No. 1, 2008, pp. 53-71.
Peng et al., "An Introduction to Logistic Regression Analysis and Reporting", The Journal of Educational Research, vol. 96, 2002, pp. 3-14.
Qin et al., "A Goodness-of-Fit Test for Logistic Regression Models Based on Case-Control Data", Biometrika, vol. 84, No. 3, Sep. 1, 1997, pp. 609-618.
Wallace et al., "Class Probability Estimates are Unreliable for Imbalanced Data (and How to Fix Them)", In Institute of Electrical and Electronics Engineers 12th International Conference on Data Mining, 2012, pp. 695-704.
Wang et al., "Large Unbalanced Credit Scoring using Lasso-Logistic Regression Ensemble", Public Library of Science One, vol. 10, No. 2, Feb. 23, 2015, pp. 1-20.
Yuan et al., "Model Selection and Estimation in Regression with Grouped Variables", Journal of the Royal Statistical Society: Series B (Statistical Methodology), vol. 68, 2006, pp. 49-67.

* cited by examiner

TECHNIQUES FOR PREDICTION MODELS USING TIME SERIES DATA

CROSS-REFERENCE TO RELATED APPLICATIONS

This application is a continuation of U.S. Ser. No. 17/218,161, filed Mar. 31, 2021, and titled "TECHNIQUES FOR PREDICTION MODELS USING TIME SERIES DATA," the entire contents of which is hereby incorporated by reference.

TECHNICAL FIELD

The present disclosure relates generally to machine learning. More specifically, but not by way of limitation, this disclosure relates to constructing and applying a prediction model to make a prediction based on time-series data through dynamic feature selection.

BACKGROUND

In machine learning, prediction models such as logistic regression, neural networks, or other types of models are useful for classification tasks (e.g., classifying an expected outcome and thereby making an outcome prediction given input predictor variables). However, existing prediction techniques have various restrictions or limitations reducing the prediction accuracy of the prediction models. For example, some techniques require that predictor variables be independent of each other. For a time-series attribute, though, each value at a given time is not independent of other values within the same time series. As a result, panel data (i.e., cross-section data that includes time-series attributes) cannot be reliably processed using these prediction techniques. Existing systems based on these prediction techniques thus can use only a single value for each time-series attribute when modeling risk, leading to low prediction accuracy due to the use of incomplete data.

SUMMARY

Various aspects of the present disclosure provide systems and methods for constructing and applying a lagged prediction model based on time-series data. In one example, a risk assessment computing system receives a risk assessment query that identifies a target entity and provides, to a lagged prediction model, an input predictor record associated with the target entity. The input predictor record includes a first group of lagged values from a first time-series attribute associated with the target entity. The lagged prediction model is trained by at least implementing a group feature selection technique configured to select the first time-series attribute as input and to deselect a second time-series attribute associated with the target entity. The risk assessment computing system computes, with the lagged prediction model, an output risk indicator from the input predictor record and transmits the output risk indicator to a remote computing system. The output risk indicator is usable for controlling access by the target entity to one or more interactive computing environments.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

DETAILED DESCRIPTION

Figure 1:
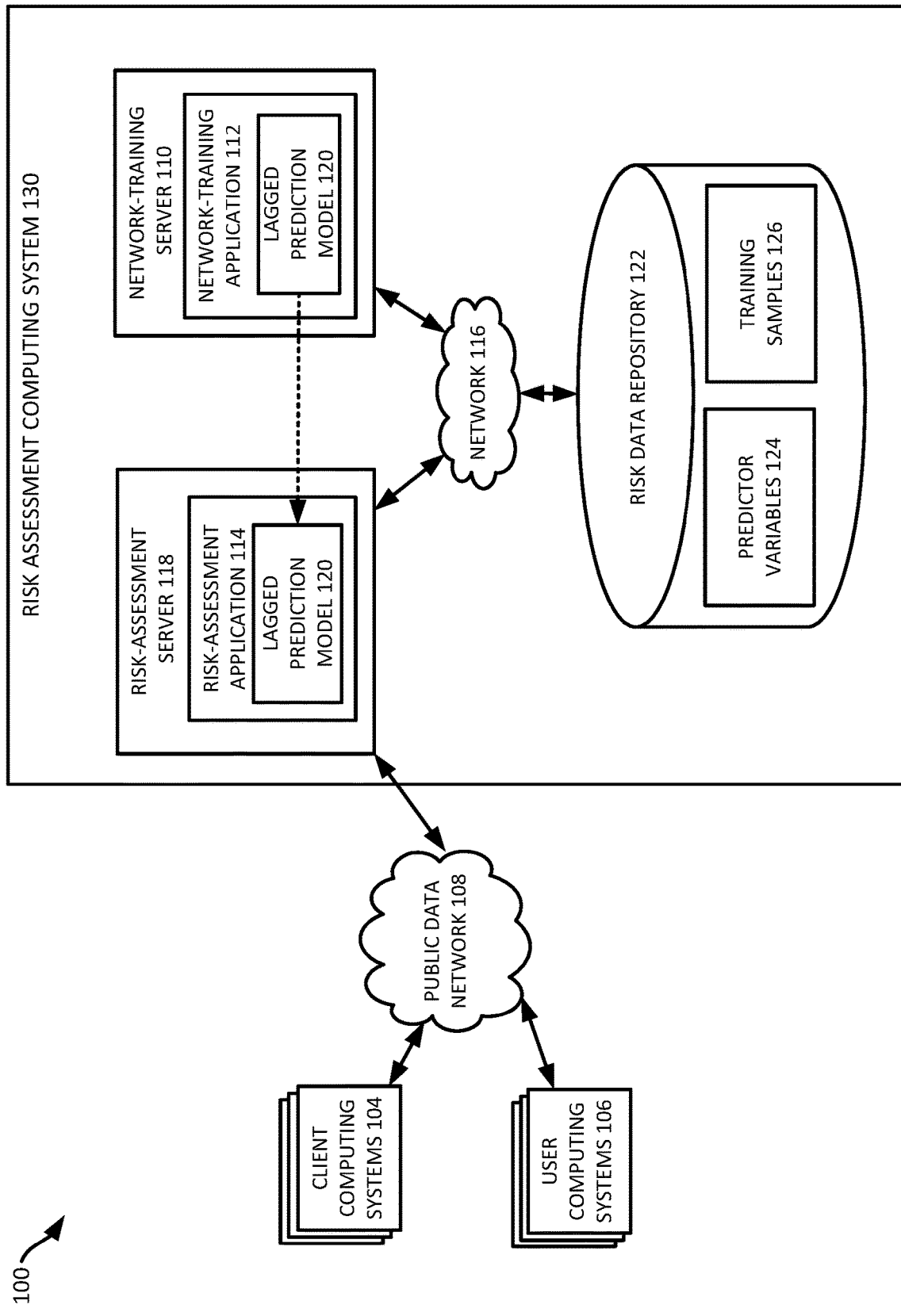
FIG. 1 is a diagram of an example of a computing environment in which a lagged prediction model is trained and applied in a risk-assessment application, according to some aspects described herein.

Certain aspects and features of the present disclosure involve constructing and applying a lagged prediction model based on time-series data. In one example, risk modeling seeks to determine whether an entity is classified as risky or not based on the past behavior of that entity. For instance, that past behavior can be reflected in time-series data, which represents how attribute values associated with the entity (e.g., computing or other types of resources currently utilized by the entity) change over time. A risk assessment computing system can construct a lagged prediction model and configure the lagged prediction model to provide a prediction of the risk for an entity based on the time-series attributes associated with the entity.

For example, a risk-assessment server may receive from a client computing system a risk assessment query for a target entity. The risk-assessment server can generate predictor attributes that include time-series attributes associated with the target entity and provide the predictor attributes to the lagged prediction model. The lagged prediction model can be trained to compute a risk indicator for an entity based on the predictor attributes generated for the entity. For example, training the lagged prediction model can include obtaining training vectors that include training predictor attributes and training outputs. A training vector includes values for the training predictor attributes and a training output for the corresponding predictor attribute values. In some examples, the training predictor attributes include time-series attributes, and values for each time-series attribute are represented as lagged values in the training predictor attributes. The lagged values for a time-series attribute can include a first lagged value representing a first time point of the time-series attribute, a second lagged value representing a second time point of the time-series attribute, and so on.

The risk assessment computing system can further select, among the set of time-series attributes, a subset of time-series attributes based on the lagged values of each time-series attribute and the training outputs. In some examples, the subset of time-series attributes can be selected to include time-series attributes whose lagged values have high correlations with the training outputs. The remaining unselected time-series attributes can be excluded from the lagged prediction model and may not be used to generate the risk prediction. The risk assessment computing system can further train the lagged prediction model and can determine the parameters of the lagged prediction model using the selected subset of time-series attributes and the training outputs.

Continuing with this example, the risk-assessment server can, in response to a risk assessment query, compute an output risk indicator for the target entity using the lagged prediction model and transmit the output risk indicator to the client computing system. As an illustrative example, the client computing system can control, based on the output risk indicator, access by the target entity to one or more interactive computing environments. In another example, the risk indicator generated for the target entity may indicate the likelihood of failure of one or more components in an industrial environment associated with the target entity. The generated risk indicator can thus be utilized to trigger an improvement of the components (e.g., upgrade the hardware or software of the components, reconfigure the components) in the industrial environment thereby reducing the likelihood of failure.

As described herein, certain aspects provide improvements to machine learning-based prediction models, such as prediction models for evaluating risks associated with an entity. Compared with existing prediction models that can only use values of predictor attributes at a given time point, the technologies presented herein can construct and apply prediction models that take into account the data of the predictor attributes at a sequence of time points. By using the time-series data of predictor attributes for prediction, the prediction accuracy of the generated prediction models can be significantly improved.

Additional or alternative aspects can implement or apply rules of a particular type that improve existing technological processes involving machine learning-based prediction such as risk assessment. For instance, to find the subset of time-series predictor attributes that can be used for prediction, a particular set of rules are employed in the training process. This particular set of rules allow the time-series attributes to be used by the prediction model by selecting or deselecting all the time-series data of a predictor attribute. Without the particular set of rules, a portion of the time-series data of a predictor attribute may be selected while the remaining portion is deselected. This leads to a conflicting selection of the predictor attribute rendering the time-series data of the predictor attribute unusable by the prediction model.

Furthermore, additional rules can be introduced in the model to further increase the efficiency or accuracy of the algorithm, such as rules for converting the time-series data for all of the predictor attributes to a one-dimensional vector, which can simplify the process of determining the parameters of the lagged prediction model. These additional rules can also include rules for selecting certain lagged values for each time-series data to reduce the training computational complexity and rules for adding auxiliary values of the time-series data to the training data (e.g., the percentage change value) to further improve the prediction accuracy.

The illustrative examples herein are given to introduce the reader to the general subject matter discussed and are not intended to limit the scope of the disclosed concepts. The following sections describe various additional features and examples with reference to the drawings in which like numerals indicate like elements, and in which descriptions are used to describe the illustrative examples but, like the illustrative examples, should not be used to limit the present disclosure.

Operating Environment Example for Machine-Learning Operations

Referring now to the drawings, FIG. 1 is a diagram of an example of an operating environment 100 in which a risk assessment computing system 130 builds and trains a lagged prediction model 120 that can be utilized to predict risk indicators based on predictor variables 124, also referred to as input variables or predictor attributes. In some embodiments, one or more of the predictor variables 124 belong to a time series.

FIG. 1 illustrates an example of hardware components of a risk assessment computing system 130, which may be distributed across one or more computing devices. In some aspects, the risk assessment computing system 130 is a specialized computing system that may be used for processing large amounts of data, possibly using a large number of computer processing cycles. The risk assessment computing system 130 can include a network-training server 110 for training a lagged prediction model 120 to enable the lagged prediction model to predict risk indicators as described herein. The risk assessment computing system 130 can further include a risk-assessment server 118 for performing a risk assessment for a given input predictor record containing predictor variables 124 that includes time-series attributes, using the trained lagged prediction model 120.

The network-training server 110 can include one or more processing devices that execute program code, such as a network-training application 112. The program code is stored on a non-transitory computer-readable medium. The network-training application 112 can execute one or more processes to train the lagged prediction model 120 for predicting risk indicators based on predictor variables 124 that include time-series attributes.

In some aspects, the network-training application 112 trains the lagged prediction model 120 utilizing training samples 126. The training samples 126 can include training vectors that relate to multiple entities, with each training sample being associated with and describing a corresponding entity. An entity can be an individual, an organization, a device, a system, a component, and so on. In some examples, training vectors in the training samples 126 include one or more training predictor attributes and training outputs. The training predictor attributes include one or more time-series attributes. The values of the time-series attributes are represented as lagged values. Each time-series attribute describes an attribute of the entity where that attribute changes over time. In some examples, a time-series attribute can include multiple elements, each element associated with a given time point and having a value describing the state of the time-series attribute at that time point. For instance, an example of a time-series attribute is account balance, for which each element of the time series is associated with a given time point (e.g., spaced out at one-month intervals) and has a value equal to the account balance at that time point. Thus, for example, the time-series attribute has a first element with a value equal to the account balance in the current time period, a second element with a value equal to the account balance a month ago, a third element with a value equal to the account balance two months ago, and so on. Each training sample 126 may include one or more time-series attributes, each having multiple values associated with respective time points, describing the associated entity. As described in more detail below, the training samples 126 may include other data as well.

The training samples 126 can be stored in one or more network-attached storage units or other storage devices on which various repositories, databases, or other structures are stored. An example of these data structures is the risk data repository 122, as shown in FIG. 1.

Network-attached storage units, such as the risk data repository 122, may store a variety of different types of data organized in a variety of different ways and from a variety of different sources. For example, the network-attached storage unit may include storage other than primary storage located within the network-training server 110 that is directly accessible by processors located therein. In some aspects, the network-attached storage unit may include secondary, tertiary, or auxiliary storage, such as large hard drives, servers, virtual memory, or other types. Storage devices may include portable or non-portable storage devices, optical storage devices, or various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory or memory devices.

The risk-assessment server 118 can include one or more processing devices that execute program code, such as a risk-assessment application 114. The program code is stored on a non-transitory computer-readable medium. The risk-assessment application 114 can execute one or more processes to utilize the lagged prediction model 120 trained by the network-training application 112 to predict risk indicators based on input predictor variables 124.

The risk assessment computing system 130 can communicate with various other computing systems, such as client computing systems 104. For example, client computing systems 104 may send risk assessment queries to the risk-assessment server 118 for risk assessment, or may send signals to the risk-assessment server 118 that controls or otherwise influences different aspects of the risk assessment computing system 130. The client computing systems 104 may also interact with user computing systems 106 via one or more public data networks 108 to facilitate interactions between users of the user computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a seller, lender, or other provider of products or services. The client computing system 104 can include one or more server devices. The one or more server devices can include or can otherwise access one or more non-transitory computer-readable media. The client computing system 104 can also execute instructions that provide an interactive computing environment accessible to user computing systems 106. Examples of the interactive computing environment include a mobile application specific to a particular client computing system 104, a web-based application accessible via a mobile device, or the like. The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a user computing system 106 to access various functions of the interactive computing environment. For instance, the interactive computing environment may transmit data to and receive data from a user computing system 106 to shift between different states of the interactive computing environment, where the different states allow one or more electronics transactions between the user computing system 106 and the client computing system 104 to be performed.

In some examples, a client computing system 104 may have other computing resources associated therewith (not shown in FIG. 1), such as server computers hosting and managing virtual machine instances for providing cloud computing services, server computers hosting and managing online storage resources for users, server computers for providing database services, and others. The interaction between the user computing system 106 and the client computing system 104 may be performed through graphical user interfaces presented by the client computing system 104 to the user computing system 106, or through an application programming interface (API) calls or web service calls.

A user computing system 106 can include a computing device or other communication device operated by a user, such as a consumer or a customer. The user computing system 106 can include one or more computing devices, such as laptops, smartphones, or other personal computing devices. A user computing system 106 can include executable instructions stored in one or more non-transitory computer-readable media. The user computing system 106 can also include one or more processing devices that are capable of executing program code to perform operations described herein. In various examples, the user computing system 106 can allow a user to access certain online services from a client computing system 104 or other computing resources, to engage in mobile commerce with a client computing system 104, to obtain controlled access to electronic content hosted by the client computing system 104, or for other purposes.

For instance, the user can use the user computing system 106 to engage in an electronic transaction with a client computing system 104 via an interactive computing environment. An electronic transaction between the user computing system 106 and the client computing system 104 can include, for example, the user computing system 106 being used to request online storage resources managed by the client computing system 104, acquire cloud computing resources (e.g., virtual machine instances), and so on. An electronic transaction between the user computing system 106 and the client computing system 104 can also include, for example, querying a set of sensitive or other controlled data, accessing online financial services provided via the interactive computing environment, submitting an online credit card application, or other digital application to the client computing system 104 via the interactive computing environment, or operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc. A user computing system 106 can be used to request access to the interactive computing environment provided by the client computing system 104, which can selectively grant or deny access to various electronic functions. Based on the request, the client computing system 104 can collect data associated with the user and communicate with the risk-assessment server 118 for risk assessment. Based on the risk indicator predicted by the risk-assessment server 118, the client computing system 104 can determine whether to grant the access request of the user computing system 106 to certain features of the interactive computing environment. The determination can be made by communicating with the risk-assessment server 118 for risk assessment or through an internal risk assessment model.

For example, a risk indicator can be generated to indicate the associated risk based on the collected data. The predicted risk indicator can be utilized by the service provider (e.g., the online resource provider or the financial service provider) to determine the risk associated with the entity accessing the service provided by the service provider, thereby granting or denying access by the entity to an interactive computing environment implementing the service. For example, if the service provider determines that the predicted risk indicator is lower than a threshold risk indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials and/or the dedicated web address, the user computing system 106 can establish a secure network connection to the computing environment hosted by the client computing system 104 and access the resources via invoking API calls, web service calls, HTTP requests, or other proper mechanisms. If the client computing system 104 determines to deny the access request, the client computing system 104 or the user computing system 106 can communicate with the risk-assessment server 118 to determine recommendations for the user to improve the risk assessment so that the access request can be approved.

In another example, the risk indicator generated for the target entity may indicate the likelihood of failure of one or more components in an industrial environment associated with the target entity. The generated risk indicator can thus be utilized to trigger an improvement of the components (e.g., upgrade the hardware or software of the components, reconfigure the components) in the industrial environment thereby reducing the likelihood of failure.

In a simplified example, the risk assessment computing system 130 depicted in FIG. 1 can configure a lagged prediction model 120 to be used for accurately determining risk indicators, such as default probabilities (i.e., probabilities that certain entities will default if extended credit) or credit scores, using predictor variables 124 of the input predictor record. A predictor variable 124 can be a variable predictive of risk that is associated with an entity. Various suitable predictor variables 124 that are authorized for use by an appropriate legal or regulatory framework may be used, and one or more of the predictor variables used may be a time-variable or a portion of a time-series variable. For time-series attributes, for which the values vary over time, lagged values can be used to represent the time-series attribute at different time points. Other predictor variables may be predictor attributes whose values are static.

Examples of predictor variables 124 used for predicting the risk associated with an entity accessing online resources can include variables indicating the demographic characteristics of the entity (e.g., name of the entity, the network or physical address of the company, the identification of the company, the revenue of the company). These predictor variables 124 can also include variables indicative of prior actions or transactions involving the entity (e.g., past requests of online resources submitted by the entity, the amount of online resource currently held by the entity, and so on). These predictor variables 124 can further include variables indicative of one or more behavioral traits of an entity (e.g., the timeliness of the entity releasing the online resources), or other predictors. Similarly, examples of predictor variables used for predicting the risk associated with an entity accessing services provided by a financial institute can include, but are not limited to, variables indicative of one or more demographic characteristics of an entity (e.g., income), variables indicative of prior actions or transactions involving the entity, variables indicative of one or more behavioral traits of an entity, etc. For example, variables indicative of prior actions or transactions involving the entity can include information that can be obtained from credit files or records, financial records, consumer records, or other data about the activities or characteristics of the entity.

In some examples, the predictor variables 124 include time-series attributes as well as resource-dependent attributes. Examples of resource-dependent attributes include attributes whose values are related to the amount of resource (e.g., online computing resources such as virtual machines, online storage resources, and monetary resources). As can be seen from these examples, although some attributes are time-dependent attributes, they can also depend on resources (e.g., the number of virtual machines used by the entity with over 90% of usage over the past five days, the number of 30-days past due occurrences within six months depending on the payment to determine the past due status).

As predicted by the lagged prediction model 120, the risk indicator can be utilized by a service provider to determine the risk associated with the entity accessing, or attempting to access, a service provided by the service provider, thereby granting or denying access by the entity to an interactive computing environment implementing the service. For example, if the service provider determines that the risk indicator is lower than a threshold risk indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials or the dedicated web address, the user computing system 106 can establish a secure network connection to the computing environment hosted by the client computing system 104 and access the resources via invoking application programming interface (API) calls, web service calls, Hypertext Transfer Protocol (HTTP) requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The numbers of devices depicted in FIG. 1 are provided for illustrative purposes. Different numbers of devices may be used. For example, while certain devices or systems are shown as single devices in FIG. 1, multiple devices may instead be used to implement these devices or systems. Analogously, devices or systems that are shown as separate, such as the network-training server 110 and the risk-assessment server 118, may be instead implemented in a signal device or system.

Figure 2:
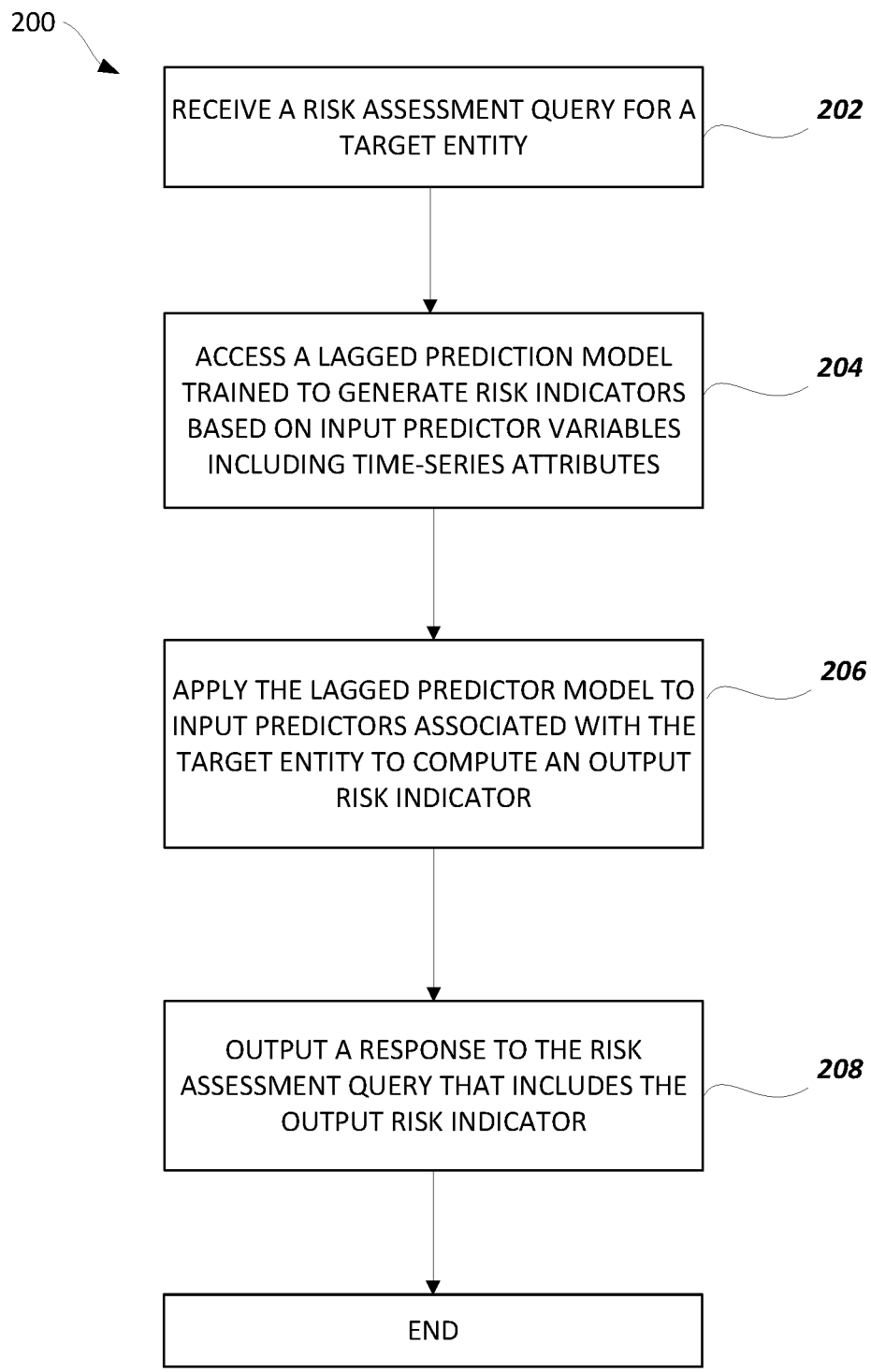
FIG. 2 is a diagram of an example of a process for utilizing a lagged prediction model to generate a risk indicator for a target entity based on a predictor record including lags associated with the target entity, according to some aspects described herein.

Examples of Operations Using Lagged Prediction Model Trained Via Machine Learning FIG. 2 is a flow diagram depicting an example of a process 200 for utilizing a lagged prediction model 120 to generate a risk indicator for a target entity based on one or more predictor variables 124 associated with the target entity. In some embodiments, one or more computing devices (e.g., the risk-assessment server 118) implement operations depicted in FIG. 2 by executing suitable program code (e.g., the risk-assessment application 114). For illustrative purposes, the process 200 is described with reference to certain examples depicted in the figures. However, other implementations are possible.

At block 202, the process 200 involves receiving a risk assessment query for a target entity from a computing device, such as a remote computing device used by or otherwise associated with the target entity requesting the risk assessment. The risk assessment query can also be received by the risk-assessment server 118 from a remote computing device associated with an entity authorized to request risk assessment of the target entity. In some aspects, the risk assessment query includes data that identifies or can be used to identify the target entity. Examples of this data include the name of an entity, an identifier of a record in which data about the entity is stored, etc.

At block 204, the process 200 involves accessing a lagged prediction model 120 trained to generate risk indicators based on input predictor variables containing time-series attributes. The lagged prediction model 120 can implement a logistic regression model with a group LASSO technique to generate the risk indicators.

At block 206, the process 200 involves applying the lagged prediction model 120 to an input predictor record associated with the target entity to compute an output risk indicator. The input predictor record can be an input vector that includes predictor variables 124 associated with the target entity. The predictor variables 124 may include attributes whose values change over time (e.g., time-series attributes) and attributes whose values are static. For a time-series attribute, multiple values for the attribute are obtained at different time points. The multiple values can be expressed as lagged values in the input predictor record to represent the time-series attribute at the different time points. The risk-assessment server 118 can access the predictor variables 124 associated with the entity from the risk data repository 122, or it can retrieve the relevant data from the risk data repository 122 and derive the attribute data from the retrieved data. For example, the attribute data associated with the entity may be pre-computed and stored as the predictor variables 124 in the risk data repository 122. The predictor variables 124 can include a first group of lagged values from a first time-series attribute associated with the target entity and a second group of lagged values from a second time-series attribute associated with the target entity. Based on the training of the lagged prediction model 120, particular lags of time-series attributes may be included in the input predictor record. For example, a first lag representing a first time point of the first time-series attribute and a second lag representing a second time point of the first time-series attribute may be included in the input predictor. Additionally, a first lag representing a first time point of the second time-series attribute and a second lag representing a second time point of the second time-series attribute may be included in the input predictor record. Additional lags of the first time-series attribute and the second time-series attribute may be excluded from the input predictor record based on the training.

At block 208, the process 200 involves outputting a response to the risk assessment query that includes the output risk indicator and transmitting the output risk indicator to the computing system requesting the risk assessment. Based on the output risk indicator, the computing system can control access by the target entity to one or more interactive computing environments. In another example, the risk indicator generated for the target entity may indicate the likelihood of failure of one or more components in an industrial environment associated with the target entity. The generated risk indicator can thus be utilized to trigger an improvement of the components (e.g., upgrade the hardware or software of the components, reconfigure the components) in the industrial environment thereby reducing the likelihood of failure.

In some aspects of the present disclosure, one or more operations shown in FIG. 2 may be omitted or performed in a different order. Similarly, additional operations not shown in FIG. 2 may be performed.

Figure 3:
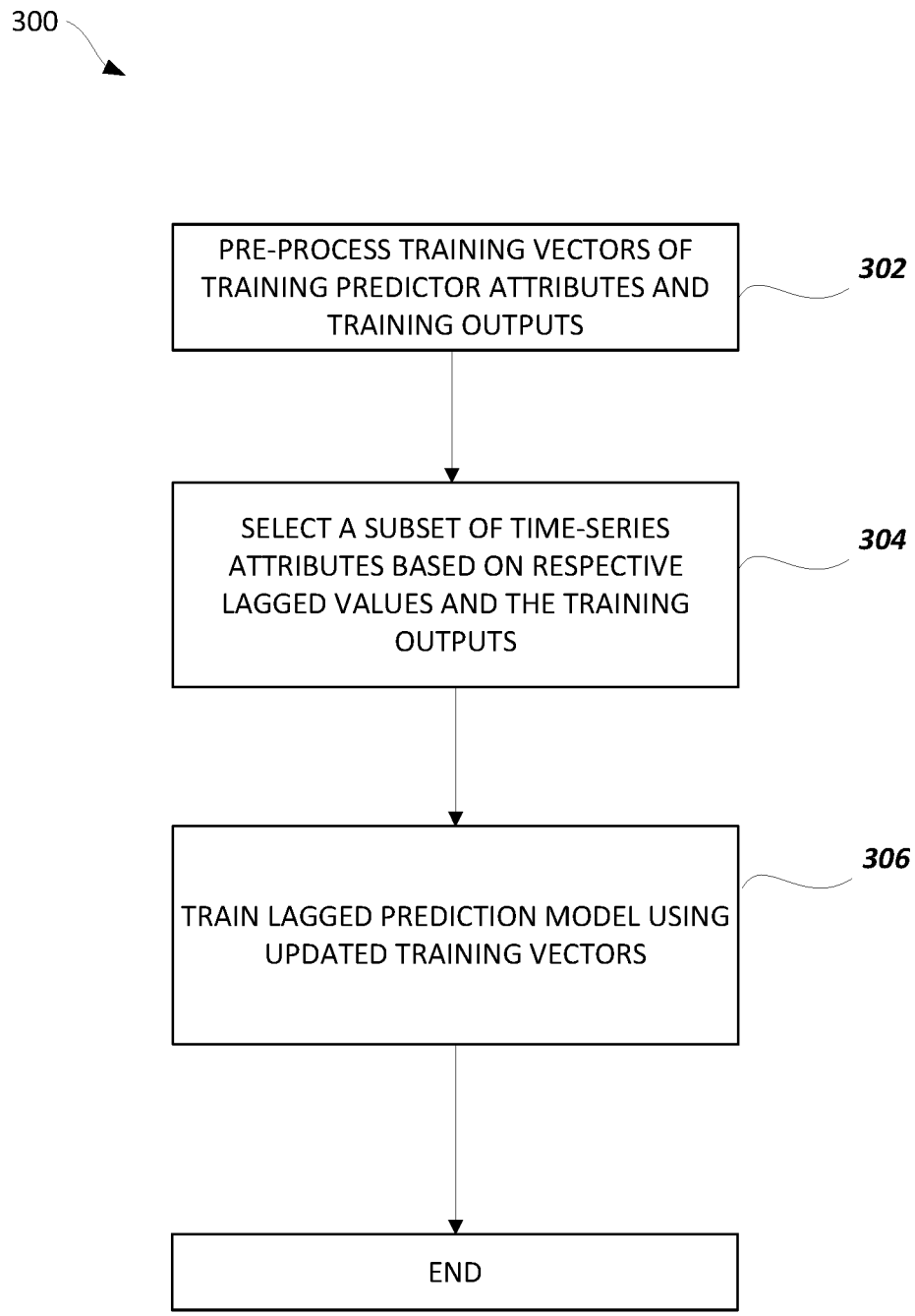
FIG. 3 is a diagram of an example of a process of training a lagged prediction model, according to some aspects described herein.

FIG. 3 is a diagram of an example of a process 300 of training a lagged prediction model, according to some aspects described herein. For illustrative purposes, the process 300 is described with reference to implementations described with respect to various examples depicted in FIG. 1. Other implementations, however, are possible. The operations in FIG. 3 are implemented in program code that is executed by one or more computing devices, such as the network-training application 112 that is executed by a network-training server 110. In some aspects of the present disclosure, one or more operations shown in FIG. 3 may be omitted or performed in a different order. Similarly, additional operations not shown in FIG. 3 may be performed. Additionally, process 300 is described using a logistic regression model as an example, but process 300 can be applied similarly to other types of prediction models.

At block 302, the process 300 involves pre-processing training vectors of training predictor attributes and training outputs. A training vector includes values for the training predictor attributes, respectively, and a training output corresponding to the particular values. The training predictor attributes include a set of time-series attributes and values of each time-series attribute are represented in the training predictor attributes as lagged values for the time-series attribute.

In some examples, the pre-processing includes the network-training application 112 dividing the training vectors into different sets or subsets for training, validation, and testing. For example, the network-training application 112 obtains three disjointed sets of the training vectors, a training set for modeling, a validation set for hyper-parameter adjustment, and a testing set for model evaluation. In some implementations, to avoid an issue of an imbalanced dataset, such as when an unequal number of the training vectors correspond to a first risk indicator and a second risk indicator, two balanced sets (e.g., a training set and a validation set) can be obtained through undersampling the majority class and oversampling the minority class. The testing set is obtained using simple random sampling without replacement to keep the class distribution in the original dataset.

Figure 4:
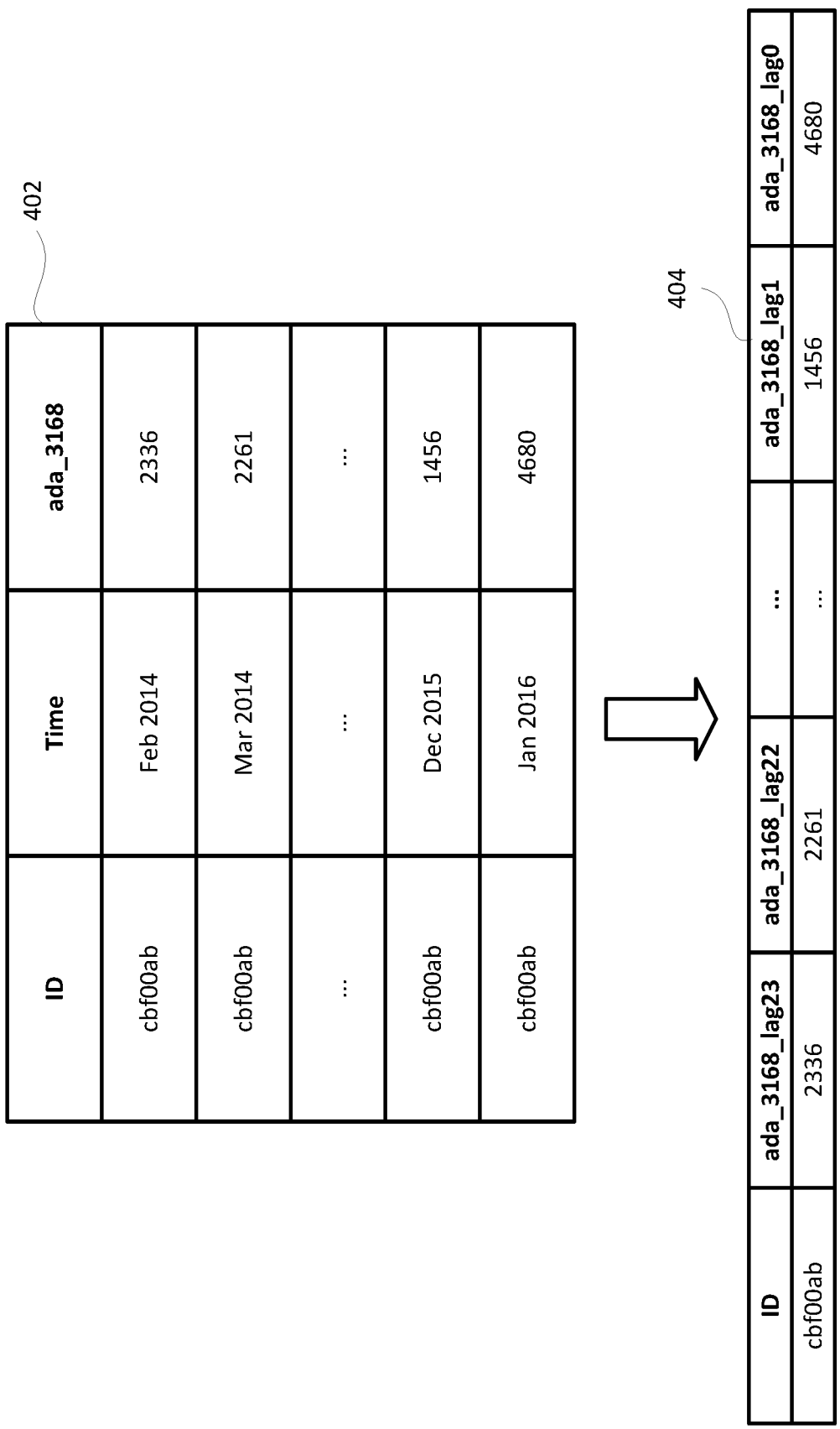
FIG. 4 illustrates an example of panel data converted into a prediction record for input into a lagged prediction model according to some aspects described herein.

The pre-processing also involves the construction of lag columns. In some examples, the time-series attributes are received as panel data and the network-training application 112 converts the received data into lag columns. FIG. 4 illustrates an example of panel data converted into a prediction record for input into the lagged prediction model 120 according to some aspects described herein. The values in FIG. 4 are exemplary values intended to illustrate the construction of lag columns from time-series attributes. In FIG. 4, table 402 is panel data received for an entity with entity ID cbf00ab over a 24-month period. The time-series attribute is ada_3168. As an example, ada_3168 can be a total revolving account balance. In another example, ada_3168 may be storage or computing resources utilized or occupied by the entity in each month. The lag columns are created, as illustrated in table 404, by transposing table 402 to spread each time-series record into a separate column with a unique name. Each column is then considered as a predictor variable in the modeling stage. The columns are named to indicate how recent the value was obtained, with ada_3168_lag0) meaning the value was obtained in the most recent month, ada_3168_lag1 meaning the value was obtained in the previous month, and so on.

Returning to FIG. 3, the pre-processing may additionally involve generating new feature columns. Adding new feature columns may capture the trend of the time-series attributes and improve the model performance. For example, the network-training application 112 can compute percentage changes for selected time-series attributes and include the percentage changes in the training predictor attributes. A percentage change between a most recent value and any previous value may be computed and added as a column. For example, a percentage change of the most recent value compared to one value before and/or a percentage change of the most recent value compared to the initial value may be computed. Each lagged predictor in the feature columns can be standardized to have a mean of 0) and a standard deviation of 1. The standardized predictors can then be used as regressors in the group LASSO lagged logistic regression method.

At block 304, the process 300 involves selecting a subset of time-series attributes based on respective lagged values and the training outputs. In some examples, the group LASSO and lagged logistic regression are used to select and deselect lagged training values for time-series attributes. For a given time-series attribute, the network-training application 112 can select or deselect all of the lagged values, also referred to herein as lagged training values. To select a group, network-training application 112 accesses lagged training values for time-series attributes and outcome values (i.e., the training outputs) associated with training entities. The time-series attributes can include a first time-series attribute and a second time-series attribute. For each time-series attribute, the network-training application 112 can determine a correlation between the lagged training values for the time-series attribute and the outcome values associated with the training entities. The network-training application 112 can then select a time series as input to the lagged prediction model 120 based on the correlation. For example, the network-training server 110 can determine the correlation between the lagged training values for the first time-series attribute and the outcome values is higher than other correlations, and the network-training application 112 can determine the first time series as input to the lagged prediction model 120.

In some instances, the network-training application 112 updates the training vectors to remove unselected time-series attributes from the training predictor attributes. The network-training application 112 generates updated outcome values based on the lagged values for the first time-series attribute. Then, for each time-series attribute in the unselected time-series attributes, the network-training application 112 determines a correlation between the lagged values for the time-series attribute and the updated training outputs and selects a second time series as input to the lagged prediction model 120. The network-training application 112 can select the second time series as input based on the correlation between the lagged values for the second time-series attribute and the updated training outputs being higher than other correlations. The above process is repeated to select more input for the lagged prediction model 120. In some examples, the correlation described herein is a group-wise correlation. The group-wise correlation can be measured as the norm of the vector of correlations between lagged values of an attributes and the related outcome values. As will be shown in the following, the group LASSO algorithm can add a penalty term to the loss function of the lagged logistic regression (as shown in Equation (2)), thereby making it a group-wise correlation based algorithm.

In some examples, cross validation or other algorithm may be used to determine the optimal number of lagged values for the time-series attributes that can be put in the lagged prediction model 120. In an example wherein each attribute has 24 lagged values over a 24-month period (e.g., the example shown in FIG. 4), a series of cross-validation experiments can be performed by changing the number of lags for each attribute from 1 to 24. The number of lagged values for each attribute can be determined as the one that generates the highest cross-validated accuracy.

Figure 5:
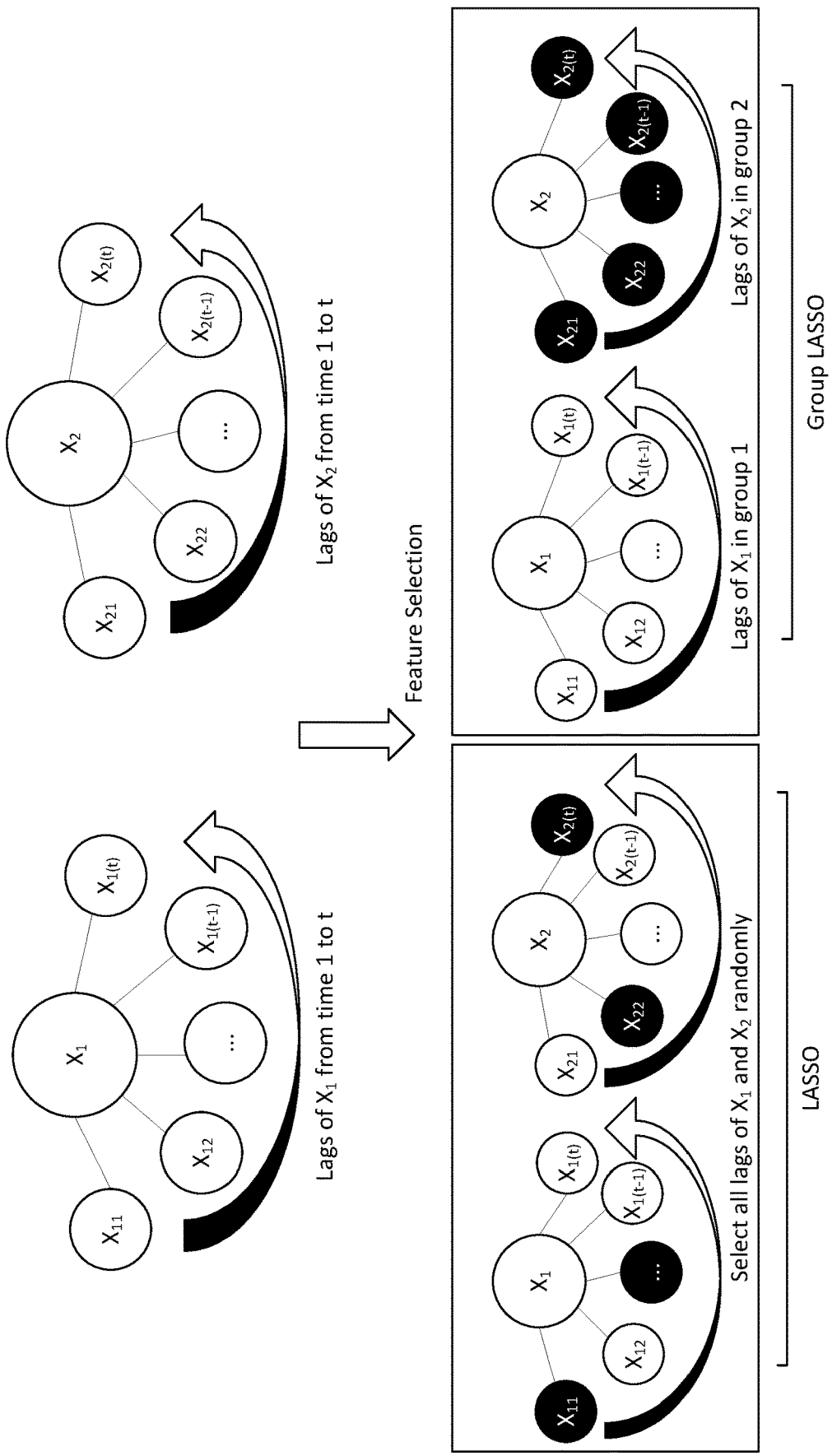
FIG. 5 is a diagram illustrating an example of feature selection, according to some aspects described herein.

FIG. 5 is a diagram illustrating an example of feature selection, according to some aspects described herein. The diagram illustrates a comparison between a traditional Least Absolute Shrinkage and Selection Operator (LASSO) technique and a group LASSO technique described herein for feature selection. The subplot on the top denotes two time-series attributes, $x_1$ and $x_2$. Both time-series attributes are recorded at each time point from time 1 to time t. Thus, $[x_{11}, x_{12}, \ldots, x_{1(t-1)}, x_{1t}]$ and $[x_{21}, x_{22}, \ldots, x_{2(t-1)}, x_{2t}]$ form a series of lags for $x_1$ and $x_2$, respectively. During the implementation of LASSO in LLR, all of the lags are considered as different regressors, and lags are selected randomly into the final model.

As shown on the bottom left subplot in FIG. 5, the lags highlighted in black are selected while others are not. In this case, it is not evident whether $x_1$ and $x_2$ are of significance for the model prediction or not since a portion of the lags of each time-series attribute is selected and another portion of the lags of each time-series attribute is unselected. However, group LASSO described herein considers all lags of $x_1$ to be in a first group and those of $x_2$ to be in a second group. The bottom right subplot shows an example case when all lags of $x_2$ are selected by the model (highlighted in black) while those of $x_1$ are not. Therefore, the network-training application 112 can determine that $x_2$ is predictive of the model outcome while $x_1$ is not. As a result, the lagged values for $x_2$ can be selected as input to the lagged prediction model 120.

Returning to FIG. 3, at block 306, the process 300 involves training the lagged prediction model. The network-training application 112 can determine the number of lags to use during the training. In some examples, the determined lags are consecutive lags. In the example shown in FIG. 4 where each attribute has 24 lags over a 24-month period, there are 24 possible numbers of lags. Denoting the 24 lags with suffix lag0, lag1, ..., lag23, the possible number of lags for the attribute can include 1 (i.e., lag0), 2 (i.e., lag0 and lag1), 3 (i.e., lag0, lag1, and lag2), and 24 (i.e., lag0, lag1, ..., and lag23). Training with more lag columns may increase model performance with longer training time while reducing the model simplicity. In some implementations, the number of lags used during the training can be the same or different from the number of lags used for selecting the subset of time-series attributes for the lagged prediction model 120 as described above with respect to block 304. The cross validation or other algorithm described above may be used to determine the number of lagged values for selecting the subset of time-series attributes or to determine the number of lags used during the training.

Assume a dataset has P time-series attributes for N entities. For the p-th attribute, $1 \leq p \leq P$, each of the N entities has associated time-series records that are collected at time point $1, 2, \ldots, T_p$. Denote $df_p$ as the degree of freedom of the p-th attribute (i.e., the number of lags of the p-th attribute). Then $df_p = T_p$. $T_p$ can be the same or different for the P attributes. By considering the lags of each attribute as different features, the values of the i-th entity can be expressed as a vector of vectors: $x_i = [x_{i(1)}, x_{i(2)}, \ldots, x_{i(P)}]$, where $x_{i(p)}$ denotes the time-series value vector of the p-th attribute for the i-th entity. Each vector $x_i(p)$ in $x_i$ can be further expressed as $x_{i(p)} = [x_{i(1,1)}, x_{i(1,2)}, \ldots x_{i(1,Tp)}]$, where $x_{i(1,j)}$ is the value of the p-th attribute for the i-th entity that was collected at time point j. Correspondingly, the coefficient vector can be expressed as a vector of vectors: $\beta = [\beta_1, \beta_2, \ldots, \beta_P]$, where $\beta_p$ denotes the coefficient vector for the p-th attributes with dimensionality $df_p$. Therefore, a logit link function $$\pi(x_i) = prob(y_i = 1|x_i) = \frac{\exp\left(\sum_{p=1}^{P} X'_{i(p)}\beta_p\right)}{1 + \exp\left(\sum_{p=1}^{P} X'_{(ip)}\beta_p\right)}$$

can be used to model the probability of input attributes being classified as a default case (e.g., $prob(y_i=1|x_i)$). The loss function for lagged logistic regression can then be expressed as:

$$L(\beta) = -\Sigma_{i=1}^{n} y_i \log \pi(x_i) + (1-y_i)\log[1-\pi(x_i)]. \qquad (1)$$

The network-training server 110 trains the lagged prediction model 120 by minimizing a convex function $S_\lambda(\beta)$ formulated as:

$$S_\lambda(\beta) = -L(\beta) + \lambda \sum_{p=1}^{P} s(df_p) \|\beta_p\|_2 = -\sum_{i=1}^{n} y_i \log \pi(x_i) + \qquad (2)$$
$$(1-y_i)\log[1-\pi(x_i)] + \lambda \sum_{p=1}^{P} s(df_p)\|\beta_p\|_2$$

In Eqn. (2), a penalty term $\lambda(.)$ is added to the lagged logistic regression of Eqn. (1). The penalty term $\lambda(.)$ ensures that the lags of each attributes are selected or deselected as a group during the training process. $\lambda$ is a hyper-parameter that controls the amount of penalty. The value of $\lambda$ can be tuned based on the dataset used. $s(.)$ is a function used to rescale the penalty with respect to $df_p$, which is the dimensionality of the parameter vector for the p-th attribute. In some examples, such as when the input data is standardized, $s(df_p)$ is defined as the square root of $df_p$. By minimizing Eqn. (2), estimations of $\beta$, denoted as $\hat{\beta}$, can be obtained and $\hat{\beta}$ can be used for prediction purposes. The definition of the convex function for group LASSO lagged logistic regression can be generalized to any panel data with a large number of attributes.

Once trained, the lagged prediction model 120 can be used to generate a risk indicator for a target entity based on a set of one or more predictor variables 124 associated with the target entity.

Example of a Computing System for Machine-Learning Operations

Figure 6:
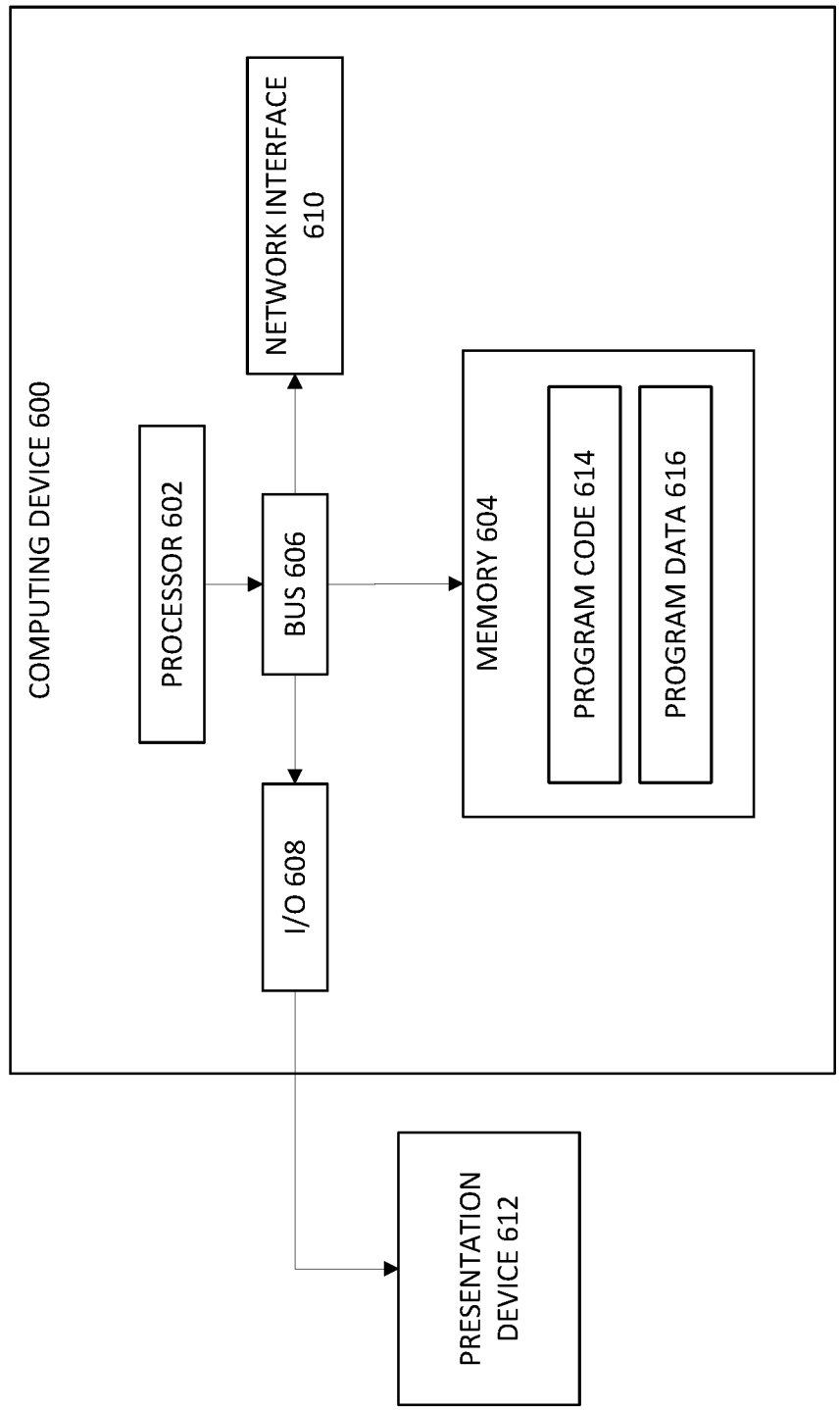
FIG. 6 is a diagram depicting an example of a computing system suitable for implementing aspects of the techniques and technologies described herein.

Any suitable computing system or group of computing systems can be used to perform the operations for the machine-learning operations described herein. For example, FIG. 6 is a block diagram depicting an example of a computing device 600, which can be used to implement the risk-assessment server 118 or the network-training server 110. The computing device 600 can include various devices for communicating with other devices in the operating environment 100, as described with respect to FIG. 1. The computing device 600 can include various devices for performing one or more operations described above with reference to FIGS. 1-5.

The computing device 600 can include a processor 602 that is communicatively coupled to a memory 604. The processor 602 executes computer-executable program code stored in the memory 604, accesses information stored in the memory 604, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 600 may also include a number of external or internal devices such as input or output devices. For example, the computing device 600 is shown with an input/output interface 608 that can receive input from input devices or provide output to output devices. A bus 606 can also be included in the computing device 600. The bus 606 can communicatively couple one or more components of the computing device 600.

The computing device 600 can execute program code 614 that includes the risk-assessment application 114 and/or the network-training application 112. The program code 614 for the risk-assessment application 114 and/or the network-training application 112 may be resident in any suitable computer-readable medium and may be executed on any suitable processing device. For example, as depicted in FIG. 6, the program code 614 for the risk-assessment application 114 and/or the network-training application 112 can reside in the memory 604 at the computing device 600 along with the program data 616 associated with the program code 614, such as the predictor variables 124 and/or the training samples 126. Executing the risk-assessment application 114 or the network-training application 112 can configure the processor 602 to perform the operations described herein.

In some aspects, the computing device 600 can include one or more output devices. One example of an output device is the network interface device 610 depicted in FIG. 6. A network interface device 610 can include any device or group of devices suitable for establishing a wired or wireless data connection to one or more data networks described herein. Non-limiting examples of the network interface device 610 include an Ethernet network adapter, a modem, etc.

Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc. In some aspects, the presentation device 612 can include a remote client-computing device that communicates with the computing device 600 using one or more data networks described herein. In other aspects, the presentation device 612 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising one or more processing devices performing operations comprising:

receiving a risk assessment query that identifies a target entity;

providing, to a lagged prediction model, an input predictor record associated with the target entity, the input predictor record comprising a set of time-series attributes associated with the target entity, wherein the lagged prediction model is trained by:

implementing a group feature selection technique configured to select a first time-series attribute as input and to deselect a second time-series attribute, and determining a number of lagged values included in a first group of lagged values of the first time-series attribute by generating and comparing cross-validated accuracies for subsets of the first group of lagged values;

computing, with the lagged prediction model, an output risk indicator from the input predictor record; and transmitting the output risk indicator to a remote computing system, wherein the output risk indicator is usable for controlling access by the target entity to one or more interactive computing environments.

2. The method of claim 1, wherein implementing the group feature selection technique comprises:

accessing lagged training values for a plurality of time-series attributes and outcome values associated with a plurality of training entities, the plurality of time-series attributes comprising the first time-series attribute and the second time-series attribute;

for each time-series attribute, determining a correlation between the lagged training values for the time-series attribute and the outcome values associated with the plurality of training entities; and selecting the first time-series attribute as input to the lagged prediction model based on the correlation between the lagged training values for the first time-series attribute and the outcome values being higher than other correlations.

3. The method of claim 2, wherein implementing the group feature selection technique further comprises:

generating updated outcome values based on the lagged training values for the first time-series attribute;

for each unselected time-series attribute, determining a correlation between the lagged training values for the unselected time-series attribute and the updated outcome values associated with the plurality of training entities; and selecting a third time-series attribute as input to the lagged prediction model based on the correlation between the lagged training values for the third time-series attribute and the updated outcome values being higher than other correlations.

4. The method of claim 1, further comprising generating the input predictor record associated with the target entity by:

accessing record data describing the target entity, the record data comprising the first time-series attribute and the second time-series attribute;

selecting from the record data a first lag representing a first time point of the first time-series attribute;

selecting from the record data a second lag representing a second time point of the first time-series attribute; and generating the input predictor record to include the first lag and the second lag and to exclude a third lag representing a third time point of the first time-series attribute.

5. The method of claim 1, wherein generating the input predictor record further comprises:

computing a percentage change applicable to the first time-series attribute; and including the percentage change in the input predictor record.

6. The method of claim 1, wherein the lagged prediction model implements a logistic regression model.

7. The method of claim 6, wherein the lagged prediction model implements a group Least Absolute Shrinkage and Selection Operator (LASSO) technique.

8. A non-transitory computer-readable storage medium having program code that is executable by a processor device to cause a computing device to perform operations, the operations comprising:

receiving, from a remote computing system, a risk assessment query that identifies a target entity;

providing, to a lagged prediction model, an input predictor record associated with the target entity, the input predictor record comprising a set of time-series attributes associated with the target entity, wherein the lagged prediction model is trained by:

implementing a group feature selection technique configured to select a first time-series attribute as input and to deselect a second time-series attribute, and determining a number of lagged values included in a first group of lagged values comprises a number of lagged values of the first time-series attribute by generating and comparing cross-validated accuracies for subsets of the first group of lagged values;

computing, with the lagged prediction model, an output risk indicator from the input predictor record; and transmitting the output risk indicator to the remote computing system, wherein the output risk indicator is usable for controlling access to one or more interactive computing environments by the target entity.

9. The non-transitory computer-readable storage medium of claim 8, wherein the operation of implementing the group feature selection technique comprises:

accessing lagged training values for a plurality of time-series attributes and outcome values associated with a plurality of training entities, the plurality of time-series attributes comprising the first time-series attribute and the second time-series attribute;

for each time-series attribute, determining a correlation between the lagged training values for the time-series attribute and the outcome values associated with the plurality of training entities; and selecting the first time-series attribute as input to the lagged prediction model based on the correlation between the lagged training values for the first time-series attribute and the outcome values being higher than other correlations.

10. The non-transitory computer-readable storage medium of claim 9, wherein the operation of implementing the group feature selection technique further comprises:

generating updated outcome values based on the lagged training values for the first time-series attribute;

for each unselected time-series attribute, determining a correlation between the lagged training values for the unselected time-series attribute and the updated outcome values associated with the plurality of training entities; and selecting a third time-series attribute as input to the lagged prediction model based on the correlation between the lagged training values for the third time-series attribute and the updated outcome values being higher than other correlations.

11. The non-transitory computer-readable storage medium of claim 8, wherein the operations further comprise generating the input predictor record associated with the target entity by:
 accessing record data describing the target entity, the record data comprising the first time-series attribute and the second time-series attribute;
 selecting from the record data a first lag representing a first time point of the first time-series attribute;
 selecting from the record data a second lag representing a second time point of the first time-series attribute; and
 generating the input predictor record to include the first lag and the second lag and to exclude a third lag representing a third time point of the first time-series attribute.

12. The non-transitory computer-readable storage medium of claim 8, wherein the operation of generating the input predictor record further comprises:
 computing a percentage change applicable to the first time-series attribute; and
 including the percentage change in the input predictor record.

13. The non-transitory computer-readable storage medium of claim 12, wherein the lagged prediction model implements a group Least Absolute Shrinkage and Selection Operator (LASSO) technique.

14. A non-transitory computer-readable storage medium having program code that is executable by a processor device to cause a computing device to perform operations, the operations comprising:
 training a lagged prediction model for computing a risk indicator from predictor attributes, wherein training the lagged prediction model to generate a trained lagged prediction model comprises:
  accessing training vectors having elements representing training predictor attributes and training outputs, wherein a particular training vector comprises (i) values for the training predictor attributes, respectively, and (ii) a training output corresponding to the values, and wherein the training predictor attributes comprise a plurality of time-series attributes, values for the plurality of time-series attributes comprising respective lagged values, wherein the respective lagged values comprise a number of lagged values, where the number of lagged values is determined by generating and comparing cross-validated accuracies for subsets of the respective lagged values, and
  selecting a subset of time-series attributes from the plurality of time-series attributes by implementing a group feature selection technique configured to select the subset of time-series attributes based on a correlation between the respective lagged values and the training outputs;
  updating the training vectors to remove unselected time-series attributes from the training predictor attributes;
  determining parameters of the lagged prediction model using the updated training vectors; and
 causing the trained lagged prediction model to be applied to predictor attributes associated with a target entity to generate an output risk indicator for the target entity, wherein the output risk indicator is usable for controlling access to one or more interactive computing environments by the target entity.

15. The non-transitory computer-readable storage medium of claim 14, wherein lagged values for a time-series attribute comprise a first lagged value representing a first time point of the time-series attribute and a second lagged value representing a second time point of the time-series attribute.

16. The non-transitory computer-readable storage medium of claim 14, wherein the operations further comprise, prior to determining the parameters of the lagged prediction model:
 computing percentage changes for the selected subset of time-series attributes; and
 including the percentage changes in the training predictor attributes of the updated training vectors.

17. The non-transitory computer-readable storage medium of claim 14, wherein selecting the subset of time-series attributes comprises:
 for each time-series attribute in the plurality of time-series attributes, determining a correlation between the lagged values for the time-series attribute and the training outputs; and
 selecting a first time-series attribute as input to the lagged prediction model based on the correlation between the lagged values for the first time-series attribute and the training outputs being higher than other correlations.

18. The non-transitory computer-readable storage medium of claim 17, wherein selecting the subset of time-series attributes further comprises:
 generating updated training outputs based on the lagged values for the first time-series attribute;
 for each time-series attribute in the unselected time-series attributes, determining a correlation between the lagged values for the time-series attribute and the updated training outputs; and
 selecting a second time-series attribute as input to the lagged prediction model based on the correlation between the lagged values for the second time-series attribute and the updated training outputs being higher than other correlations.

19. The non-transitory computer-readable storage medium of claim 14, wherein the lagged prediction model implements a logistic regression model.

20. The non-transitory computer-readable storage medium of claim 14, wherein the lagged prediction model implements a group Least Absolute Shrinkage and Selection Operator (LASSO) technique.

* * * * *